United States Patent
Parry-Williams et al.

(10) Patent No.: US 10,752,303 B2
(45) Date of Patent: Aug. 25, 2020

(54) COMPONENT FOR CONTROLLING DOWNFORCE GENERATED BY A VEHICLE

(71) Applicant: McLaren Automotive Limited, Woking (GB)

(72) Inventors: Dan Parry-Williams, Woking (GB); Arthur Slight, Woking (GB)

(73) Assignee: McLaren Automotive Limited, Woking (GB)

( * ) Notice: Subject to any disclaimer, the term of this patent is extended or adjusted under 35 U.S.C. 154(b) by 154 days.

(21) Appl. No.: 16/134,894

(22) Filed: Sep. 18, 2018

(65) Prior Publication Data
US 2019/0031253 A1    Jan. 31, 2019

Related U.S. Application Data

(63) Continuation of application No. 15/389,265, filed on Dec. 22, 2016, now Pat. No. 10,106,211, which is a
(Continued)

(30) Foreign Application Priority Data

Sep. 21, 2012    (GB) .................................. 1216941.3

(51) Int. Cl.
*B60J 9/00*    (2006.01)
*B62D 37/02*    (2006.01)
(Continued)

(52) U.S. Cl.
CPC .............. *B62D 37/02* (2013.01); *B60K 11/04* (2013.01); *B60K 11/08* (2013.01); *B60K 11/085* (2013.01);
(Continued)

(58) Field of Classification Search
CPC ...... B62D 37/02; B62D 35/007; B62D 35/02; B60J 10/24; B60J 10/86; B60K 11/04; B60K 15/05; Y02T 10/82; E05B 83/34
See application file for complete search history.

(56) References Cited

U.S. PATENT DOCUMENTS 3,933,136 A * 1/1976 Burst .................... B60K 11/08
                                                    123/41.58
4,052,099 A * 10/1977 Lowery .................. B60J 1/2005
                                                    296/91
(Continued)

FOREIGN PATENT DOCUMENTS

AT        009506 U1    11/2007
DE        2616948 A1   10/1977
(Continued)

OTHER PUBLICATIONS

International Search Report and Written Opinion of the International Searching Authority, Int'l Appln. No. PCT/EP2013/067569, dated Oct. 15, 2013.

*Primary Examiner* — Kiran B Patel
(74) *Attorney, Agent, or Firm* — Dergosits & Noah LLP

(57) ABSTRACT

An automobile comprising a cooling duct that extends to underneath the automobile to channel cooling air to a component of the automobile when the automobile is in motion is provided. A restriction located within the cooling duct that is moveable from a first position, in which airflow to the component is substantially unimpeded, to a second position in which the airflow to the component is substantially impeded, when the automobile is in motion is further provided. The automobile generates more downforce when the restriction is in the second position versus the first position. A control unit configured to select the position of the restriction to control the downforce generated by the automobile if the temperature of the component is below a
(Continued)

predetermined level, and to select the first position for the restriction if the temperature of the component is above the predetermined level, is also provided.

17 Claims, 10 Drawing Sheets

Related U.S. Application Data continuation of application No. 14/430,092, filed as application No. PCT/EP2013/067569 on Aug. 23, 2013, now Pat. No. 9,561,827.

(51) Int. Cl.
| | |
|---|---|
| *B60T 1/16* | (2006.01) |
| *B60T 5/00* | (2006.01) |
| *B62D 35/00* | (2006.01) |
| *B62D 35/02* | (2006.01) |
| *G05D 3/00* | (2006.01) |
| *B60K 11/08* | (2006.01) |
| *F15D 1/10* | (2006.01) |
| *B60K 11/04* | (2006.01) |

(52) U.S. Cl.
 CPC ....... *B60T 1/16* (2013.01); *B60T 5/00* (2013.01); *B62D 35/005* (2013.01); *B62D 35/02* (2013.01); *F15D 1/10* (2013.01); *G05D 3/00* (2013.01); *B60Y 2300/0453* (2013.01); *B60Y 2300/0457* (2013.01); *B60Y 2306/05* (2013.01)

(56) References Cited

U.S. PATENT DOCUMENTS

| | | | | | |
|---|---|---|---|---|---|
| 4,131,308 | A | * | 12/1978 | Holka | B62D 35/005 296/180.5 |
| 4,159,140 | A | * | 6/1979 | Chabot | B62D 35/005 296/180.5 |
| 4,379,582 | A | * | 4/1983 | Miwa | B62D 35/005 296/180.5 |
| 4,457,558 | A | * | 7/1984 | Ishikawa | B60K 11/085 296/180.5 |
| 4,460,213 | A | * | 7/1984 | Janssen | B60K 11/085 296/180.5 |
| 4,659,130 | A | * | 4/1987 | Dimora | B62D 35/005 296/180.1 |
| 4,706,615 | A | * | 11/1987 | Scadding | F01P 11/10 123/198 E |
| 4,772,062 | A | * | 9/1988 | Janssen | B62D 35/007 296/180.5 |
| 4,810,021 | A | * | 3/1989 | Burst | B60T 5/00 296/180.1 |
| 4,938,303 | A | * | 7/1990 | Schaal | B60H 1/3227 123/41.48 |
| 4,951,994 | A | * | 8/1990 | Miwa | B62D 35/005 296/180.1 |
| 5,022,884 | A | * | 6/1991 | Hippely | A63H 17/02 446/14 |
| 5,511,847 | A | * | 4/1996 | Weisbarth | B60C 23/18 296/180.1 |
| 5,692,796 | A | * | 12/1997 | Yamamoto | B62D 35/005 296/180.1 |
| 6,033,010 | A | * | 3/2000 | Preiss | B62D 35/005 296/180.1 |
| 6,230,836 | B1 | * | 5/2001 | Cowan | B62D 21/10 180/118 |
| 6,315,091 | B1 | * | 11/2001 | Nilsen | F16D 65/847 188/264 A |
| 6,575,522 | B2 | * | 6/2003 | Borghi | B62D 35/005 296/180.5 |
| 6,886,883 | B2 | * | 5/2005 | Jacquemard | B62D 35/005 296/180.5 |
| 7,040,690 | B2 | * | 5/2006 | Soja | B62D 35/005 296/180.5 |
| 7,290,630 | B2 | * | 11/2007 | Maeda | B62D 25/084 180/68.2 |
| 7,661,753 | B2 | * | 2/2010 | Shinedling | B62D 35/005 296/180.5 |
| 7,717,494 | B2 | * | 5/2010 | Nagahama | B62D 35/02 296/180.5 |
| 7,780,223 | B2 | * | 8/2010 | Kottenstette | B62D 35/005 296/180.1 |
| 8,297,685 | B2 | * | 10/2012 | Wolf | B62D 35/005 296/180.3 |
| 8,356,856 | B2 | * | 1/2013 | Danev | B62D 35/005 296/180.1 |
| 8,544,583 | B2 | * | 10/2013 | Ajisaka | B60K 11/08 180/68.1 |
| 8,731,781 | B2 | * | 5/2014 | Prentice | B62D 35/02 701/49 |
| 8,794,363 | B2 | * | 8/2014 | Wolf | B60K 11/085 180/68.1 |
| 8,798,868 | B2 | * | 8/2014 | Mares | B60T 8/1755 104/282 |
| 8,878,047 | B2 | * | 11/2014 | Wittorf | B60K 16/00 136/205 |
| 9,102,366 | B1 | * | 8/2015 | Kim | B62D 35/005 |
| 9,126,639 | B2 | * | 9/2015 | Hoelzel | B62D 35/005 |
| 9,126,640 | B2 | * | 9/2015 | Hoelzel | B62D 35/005 |
| 9,199,674 | B2 | * | 12/2015 | Wolf | B60K 11/08 |
| 9,216,644 | B2 | * | 12/2015 | Cardile | B60H 1/241 |
| 9,266,571 | B2 | * | 2/2016 | D'Arcy | B62D 35/005 |
| 9,950,751 | B2 | * | 4/2018 | Heil | B62D 35/00 |

FOREIGN PATENT DOCUMENTS

| | | |
|---|---|---|
| DE | 10235702 A1 | 2/2004 |
| GB | 2400585 A | 10/2004 |

* cited by examiner

COMPONENT FOR CONTROLLING DOWNFORCE GENERATED BY A VEHICLE

CROSS REFERENCE

This patent application is a continuation of U.S. patent application Ser. No. 15/389,265, filed Dec. 22, 2016, which is a continuation of U.S. patent application Ser. No. 14/430,092, filed Mar. 20, 2015, entitled "ADJUSTABLE COMPONENT COOLING DEVICE FOR CONTROLLING DOWNFORCE GENERATED BY A VEHICLE," which is a National Phase entry of PCT Application No. PCT/EP2013/067569, entitled DEVICES FOR CONTROLLING THE DOWNFORCE GENERATED BY A VEHICLE, filed on Aug. 23, 2013, which claims priority to United Kingdom Patent Application No. GB1216941.3, filed on Sep. 21, 2012, each of which are incorporated by reference along with all other references cited in this application. This patent application is related to U.S. patent application Ser. No. 15/389,258, filed on Dec. 22, 2016, which is also a continuation of U.S. patent application Ser. No. 14/430,092, filed Mar. 20, 2015, entitled "ADJUSTABLE COMPONENT COOLING DEVICE FOR CONTROLLING DOWNFORCE GENERATED BY A VEHICLE."

FIELD OF DISCLOSURE

This invention relates to an apparatus for use in controlling the downforce generated by a vehicle.

BACKGROUND

The downforce generated by a vehicle can have a substantial effect on the cornering and braking capability of the vehicle. In practical situations, it is often the case that an increase in downforce (by, for example, adding spoilers to the vehicle) is accompanied by an increase in drag, meaning that a vehicle set-up to generate high levels of downforce will be compromised by a reduction in its maximum straight line speed.

FIG. 1 is a schematic diagram of the airflow over a typical vehicle. Taken in the frame of reference of the vehicle travelling in the negative x-direction, as the air flows over the vehicle it will stagnate at its front end 101 creating a region of relatively high pressure. The fast flowing air over the bonnet will create a region of relatively low pressure 102. The sharp change in curvature of the body of the vehicle towards its rear end 103 will cause the flow to separate from the body in this region, creating a region of low pressure 104. Various aerodynamic devices have been developed to increase the pressure in the low pressure regions and to decrease the pressure in the regions underneath the vehicle in order to increase the downforce generated by the vehicle and improve cornering performance.

A common device used to increase the pressure of the air in the low pressure region is the rear wing. A typical rear wing is shown in FIG. 2. The profile of a typical rear wing consists of a relatively flat upper portion 201 and a relatively curved lower portion 202. As air flows over the wing the curved lower portion deflects the air upwards, hence the wing is exerting a resultant force F1 on the air in the positive vertical direction. In accordance with Newton's third law, the air will exert an equal and opposite force on the wing. This equal and opposite force F2 is the downforce generated by the rear wing.

A splitter is an aerodynamic device that operates to decrease the pressure of the air under the body of the vehicle. A vehicle fitted with a typical splitter is shown in FIG. 3. As air travels towards the front of the vehicle a portion of the airflow will be directed over the top surface of the splitter 301 and a portion of the air will be diverted under the bottom surface of the splitter 302. The airflow over the top of the splitter will stagnate, causing a region of high pressure, whilst the portion of the airflow that is channelled between the splitter surface 302 and the ground will be accelerated under the body of the vehicle. For a particular streamline, increasing the flow speed of the air will cause its pressure to drop in accordance with Bernoulli's principle, and so channelling high speed air under the surface of the vehicle helps to lower the pressure in this region and hence increases the downforce generated by the vehicle. This effect is increased as the distance between the lower surface 302 of the splitter and the ground is decreased.

Louvered wheel arches can also be used to increase the downforce generated by a vehicle and are typically implemented on race cars. An example of a louvered wheel arch is shown in FIG. 4. When a vehicle is travelling at speed the pressure of the air inside the wheel arches 401 is generally higher than the pressure of the air flowing over the surface of the vehicle body 402. Louvered wheel arches 403 alleviate this result by providing a path for the high pressure air inside the wheel arches to flow into the lower pressure region over the surface of the body. Louvered wheel arches are also useful for aiding the cooling of the brake system.

It is often desirable for a vehicle to increase the downforce it generates due to the beneficial effects on its cornering ability. However, increasing the downforce can lead to an increase in drag which compromises the straight line speed of the vehicle and increases its fuel consumption. Furthermore at very high speeds the downforce generated may overload the vehicle and result in significant changes in aerodynamic stability under different dynamic conditions, making the vehicle difficult to control.

There is thus a need for an improved means of controlling the downforce generated by a vehicle.

SUMMARY OF INVENTION

According to a first aspect of the present invention there is provided: an automobile comprising: a flap provided on the underside of the automobile, the flap being deployable from a first position in which, when the automobile is in motion, the flap extends minimally into the flow of air beneath the automobile up to a second position in which, when the automobile is in motion, the flap extends maximally into the flow of air beneath the automobile so as to reduce the downforce generated by the automobile; and a control unit adapted to receive one or more inputs that indicate the dynamic state of the automobile and select a position of the in dependence on the said dynamic state so as to control the downforce generated by the automobile, the control unit being configured so that if the inputs indicate that the automobile is undergoing braking the position of the flap is selected so as to counter the tendency of the automobile to dive due to braking.

Suitably the flap is positioned in a position between the first and second positions.

Preferably the flap is positioned in front of the front wheels of the automobile.

The inputs could include one or more of suspension load, automobile speed, lateral g-force, steering position, brake pedal force, brake pedal position, forward acceleration of the automobile, or the position of one or more active aerodynamic devices of the automobile.

According to a second aspect of the present invention there is provided: an automobile comprising: first and second flaps provided on the underside of the automobile, the first and second flaps being positioned symmetrically about the centreline of the automobile, wherein each flap is deployable from a respective first position in which, when the automobile is in motion, each flap extends minimally into the flow of air beneath the automobile, up to a respective second position in which, when the automobile is in motion, each flap extends maximally into the flow of air beneath the automobile so as to reduce the downforce generated by the automobile; and a control unit adapted to receive one or more inputs that indicate the dynamic state of the automobile and select positions of the first and second flaps between their respective first and second positions, the positions of the first and second flaps being chosen in dependence on the said dynamic state so as to control the downforce generated by the automobile, wherein if the inputs indicate that the automobile is cornering, the positions of the first and second flaps are selected so as to counter roll of the automobile.

Suitably the control unit is configured to select the positions of the first and second flaps such that the flap on the outside of the corner is extended to a greater degree than the flap on the inside of the corner.

Suitably the control unit selects the first position for the flap on the inside of the corner.

Preferably the first and second flaps are positioned in front of the front wheels of the automobile.

The inputs could include one or more of suspension load, automobile speed, lateral g-force, steering position, brake pedal force, brake pedal position, forward acceleration of the automobile, or the position of one or more active aerodynamic devices of the automobile.

Suitably, if the inputs indicate that the automobile is undergoing braking, the positions of the first and second flaps are selected so as to counter the tendency of the automobile to dive due to braking.

Suitably the positions of the first and second flaps elected between their respective first and second positions in dependence on the one or more inputs.

According to a third aspect of the present invention there is provided an automobile comprising: a cooling duct arranged to channel cooling air to a component of the automobile when the automobile is in motion, the cooling duct extending to underneath the automobile; a restriction located within the cooling duct, moveable from a first position in which airflow to the component is substantially unimpeded, to a second position in which the airflow to the component is substantially impeded, such that, when in motion, the automobile generates more downforce when the restriction is in the second position than when the restriction is in the first position; and a control unit configured to, if the temperature of the component is below a predetermined level, select the position of the restriction so as to control the downforce generated by the automobile and, if the temperature of the component is above the predetermined level, select the first position for the restriction.

Preferably the restriction comprises movable louvres.

Preferably the automobile comprises a front splitter, and the duct extends from a region above the front splitter to underneath the automobile.

Preferably the duct extends to a wheelarch of the automobile.

The said component could comprise the braking system of the automobile.

The said component could be a radiator.

The said component could be an engine compartment of the automobile.

The automobile could further comprises a second duct arranged to channel air from a region which is at relatively high pressure when the automobile is in motion to a region underneath the automobile, the second duct comprising a resilient elastic restriction arranged to substantially close off the duct, the duct being configured such that motion of the automobile generates a pressure difference across the elastic restriction, the elastic restriction being configured to open when the pressure difference approximately exceeds a predetermined value so as to allow air to flow from the relatively high pressure region to underneath the automobile and reduce the downforce generated by the automobile.

The region of relatively high pressure could be the cooling duct.

The region underneath the automobile could be in front of a front wheel of the automobile.

The resilient elastic restriction could be arranged to be substantially flush with a surface of the cooling duct when it substantially closes off the second duct.

The automobile could further comprise a flap positioned on the underside of the automobile, the flap being deployable from a first position to a second position such that there can only be an airflow from the relatively high pressure region to the relatively low pressure region through the second duct when the flap is deployed from its first position.

Preferably the flap is arranged such that, when the automobile is in motion, the flap extends minimally into the flow beneath the automobile when it is in its first position and extends maximally into the flow beneath the automobile when in its second position.

Suitably the control unit is configured to select the position of the flap between its first and second positions so as to control the downforce generated by the automobile.

Suitably the control unit is configured to: receive one or more inputs that indicates the dynamic state of the automobile; and select a position of the flap in dependence on the dynamic state so as to control the downforce generated by the automobile, the flap being positioned between said first and second positions.

The one or more inputs could include one or more of suspension load, automobile speed, lateral g-force, steering position, brake pedal force, brake pedal position, forward acceleration of the automobile.

Suitably if the inputs indicate that the downforce generated by the automobile exceeds a predetermined level, the position of the flap is selected between its first and second positions in dependence on one or more inputs.

Suitably if the inputs indicate that the automobile is undergoing braking, the position of the flap is selected between its first and second positions so as to counter the tendency of the automobile to dive under braking.

Suitably the control unit is configured to: receive one or more inputs that indicate the dynamic state of the automobile; and it the temperature of the component is below its predetermined level, select a position of the restriction so as to control the downforce generated by the automobile, and, if the temperature of the component is above the predetermined level, select the first position of the restriction.

The inputs could include one or more of suspension load, automobile speed, lateral g-force, steering position, brake pedal force, brake pedal position, forward acceleration of the automobile, or the position of one or more active aerodynamic devices of the automobile.

Suitably if the inputs indicate that the automobile is in a first dynamic state in which the automobile generates a downforce that exceeds a predetermined level, the position of the restriction is selected in dependence on the one or more inputs so as to reduce the downforce generated by the automobile.

Suitably if the inputs indicate that the automobile is in a second dynamic state in which the automobile is undergoing braking, and if the temperature of the component is below the predetermined level, the position of the restriction is selected so as to counter the tendency of the automobile to dive due to braking.

Preferably if the temperature of the component is above the predetermined level, the restriction is positioned in its first position.

Preferably the automobile further comprises: a second cooling duct, the second cooling duct arranged to channel cooling air to a component of the automobile when the automobile is in motion, the second cooling duct extending to underneath the automobile; a second restriction located within the second cooling duct, moveable from a first position in which airflow to the component is substantially unimpeded, up to a second position in which the airflow to the component is substantially impeded, such that, when in motion, the automobile generates more downforce when the restriction is in the second position than when the restriction is in the first position, the control unit being configured to, if the temperature of the said component is below a predetermined level, select a position of the restriction so as to control the downforce generated by the automobile and, if the temperature of the said component is above the predetermined level, select the first position of the second restriction.

Preferably the first and second restrictions are located either side of the centreline of the automobile.

Suitably the control unit is adapted to: receive one or more inputs that indicate the dynamic state of the automobile; select a position of the first restriction between its said first and second positions if the temperature of the first component is below its predetermined level, the restriction being in its first position if the said temperature is above its predetermined level; and select a position of the second restriction between its said first and second positions if the temperature of the second component is below its predetermined level, the second restriction being in its first position if the said temperature is above its predetermined level, the positions of the first and second restrictions being chosen in dependence on the said dynamic state so as to control the downforce generated by the automobile, wherein if the inputs indicate that the automobile is cornering, the positions of the first and second restrictions are selected so as to counter roll of the automobile.

Suitably the control unit is configured to select positions of the first and second restrictions such that the restriction on the outside of the corner is opened to a greater degree than the restriction on the inside of the corner.

According to a fourth aspect of the present invention there is provided an automobile comprising a duct arranged to channel air from a region which is at relatively high pressure when the automobile is in motion to a region underneath the automobile which is at relatively low pressure when the automobile is in motion, the duct comprising a resilient elastic restriction arranged to substantially close off the duct, the duct being configured such that motion of the automobile generates a pressure difference across the elastic restriction, the elastic restriction being configured to open when the pressure difference approximately exceeds a predetermined value so as to allow air to flow from the relatively high pressure region to underneath the automobile and reduce the downforce generated by the automobile.

Preferably the resilient elastic restriction is adapted to open when the automobile is travelling approximately above a certain speed.

Preferably wherein the resilient elastic restriction comprises a flap coupled by a resilient elastic member to the duct.

Preferably the automobile further comprises a front splitter and the region of relatively high pressure is above the front splitter.

Preferably the automobile further comprises: a flap positioned on the underside of the automobile, the flap being deployable from a first position to a second position such that the duct can only provide a path for the airflow from the relatively high pressure region to a region underneath the automobile when the flap is deployed from its first position; and a control unit configured to, when the automobile is in motion, position the flap between said first and second positions so as to control the downforce generated by the automobile.

Suitably the flap is arranged such that, when the automobile is in motion, the flap extends minimally into the flow beneath the automobile when it is in its first position and extends maximally into the flow beneath the automobile when in its second position.

Suitably the control unit is adapted to: receive one or more inputs that indicate the dynamic state of the automobile; and select a position of the flap in dependence on the said dynamic state so as to control the downforce generated by the automobile.

Suitably if the one or more inputs indicate that the automobile is in a first dynamic state in which the downforce generated by the automobile exceeds a predetermined level, the position of the flap is selected so as to reduce the downforce generated by the automobile.

Suitably if the one or more inputs indicate that the automobile is in a second dynamic state in which the vehicle is undergoing braking, the position of the flap is selected so as to counter the tendency of the automobile to dive due to braking.

Preferably the automobile further comprises a second duct arranged to channel air from a region which is at relatively high pressure when the automobile is in motion to a region underneath the automobile, the second duct comprising a resilient elastic restriction arranged to substantially close off the second duct, the second duct being configured such that motion of the automobile generates a pressure difference across the elastic restriction, the elastic restriction being configured to open when the pressure difference approximately exceeds a predetermined value so as to allow air to flow from the relatively high pressure region to underneath the automobile and reduce the downforce generated by the automobile.

Preferably the resilient elastic restriction comprises a flap coupled by a resilient elastic member to the second duct.

Preferably the automobile further comprises: a second flap positioned on the underside of the automobile, the second flap being deployable from a first position up to a second position such that the second duct can only provide a path for the air to flow from the relatively high pressure region to the region beneath the automobile through second duct when the second flap is deployed from its first position, the control unit being configured to, when the automobile is in motion, position the second flap between the first and second positions of the flap so as to control the downforce generated by the automobile.

Preferably the first and second flaps are positioned either side of the centreline of the automobile.

Suitably the control unit is adapted to: receive one or more inputs that indicate the dynamic state of the automobile; position the first flap between its said first and second positions; position the second flap between its said first and second positions, the positions of the first and second flaps being chosen in dependence on the dynamic state so as to control the downforce generated by the automobile, wherein if the inputs indicate that the automobile cornering, the positions of the first and second flaps is selected so as to counter the roll of the automobile.

Suitably the control unit is configured to select the positions of the first and second flaps such that the flap on the outside of the corner is extended to a greater degree than the flap on the inside of the corner.

BRIEF DESCRIPTION OF THE DRAWINGS

The present disclosure will now be described by way of example with reference to the following drawings. In the drawings.

DETAILED DESCRIPTION

The apparatus described below provides a means for actively controlling the amount of downforce generated by a vehicle.

Figure 1:
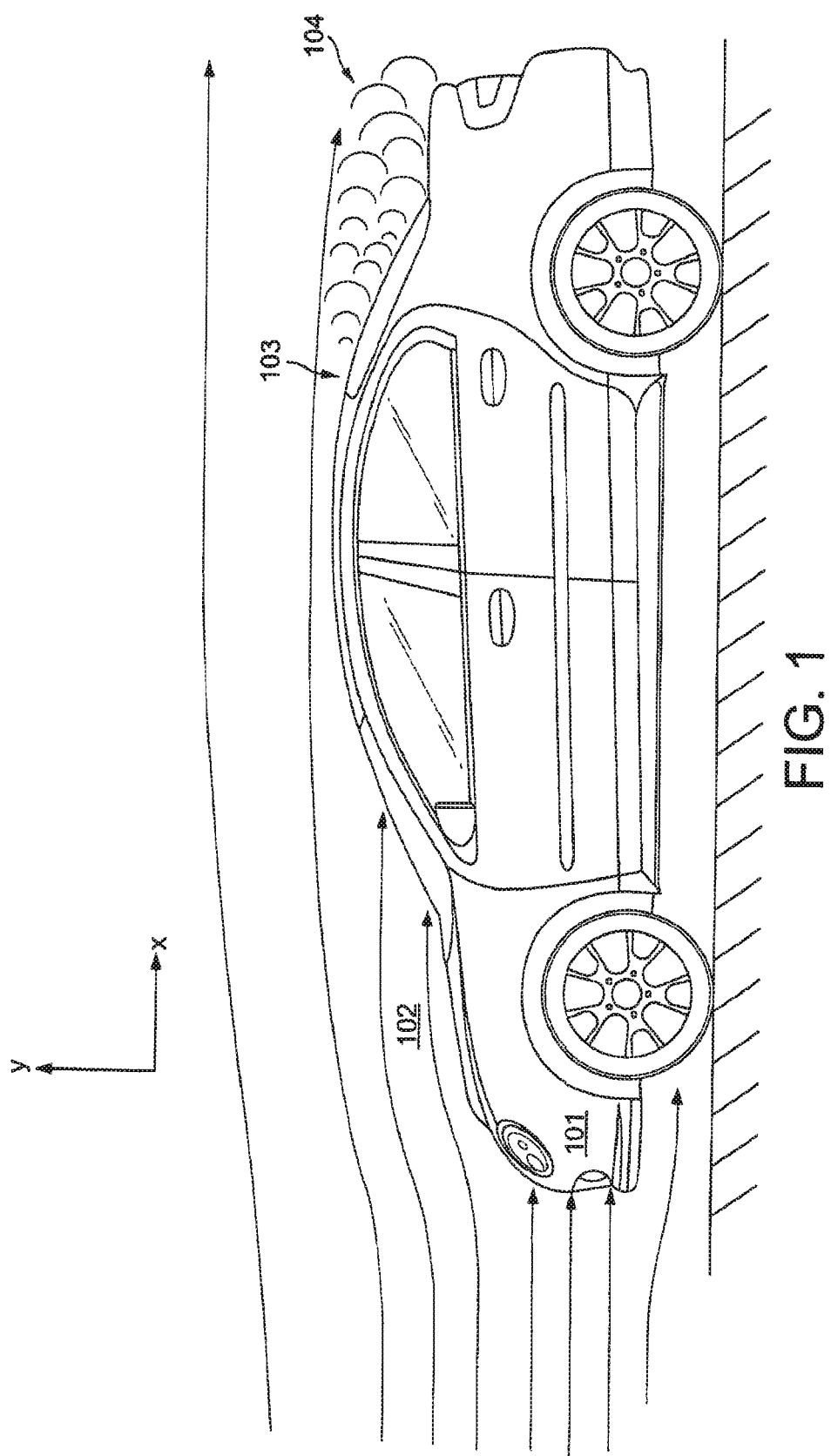
FIG. 1 depicts prior art and is a schematic diagram of the airflow over a typical vehicle.
Figure 2:
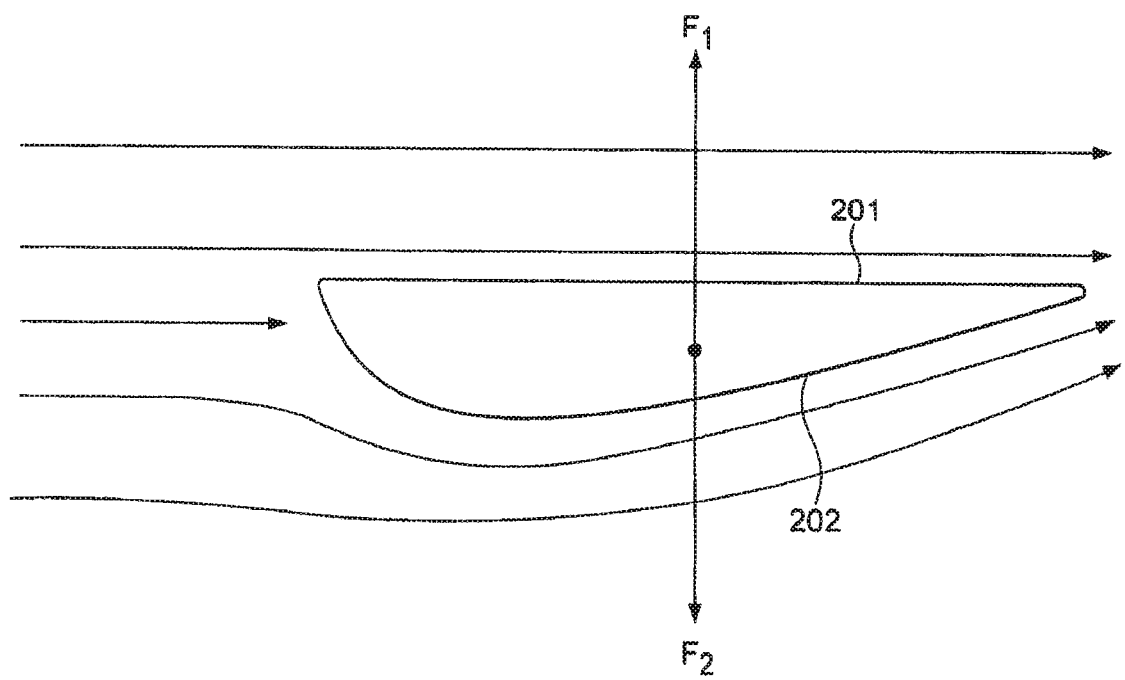
FIG. 2 depicts prior art and is a schematic diagram of the flow field generated by a rear wing with the aim of generating downforce.
Figure 3:
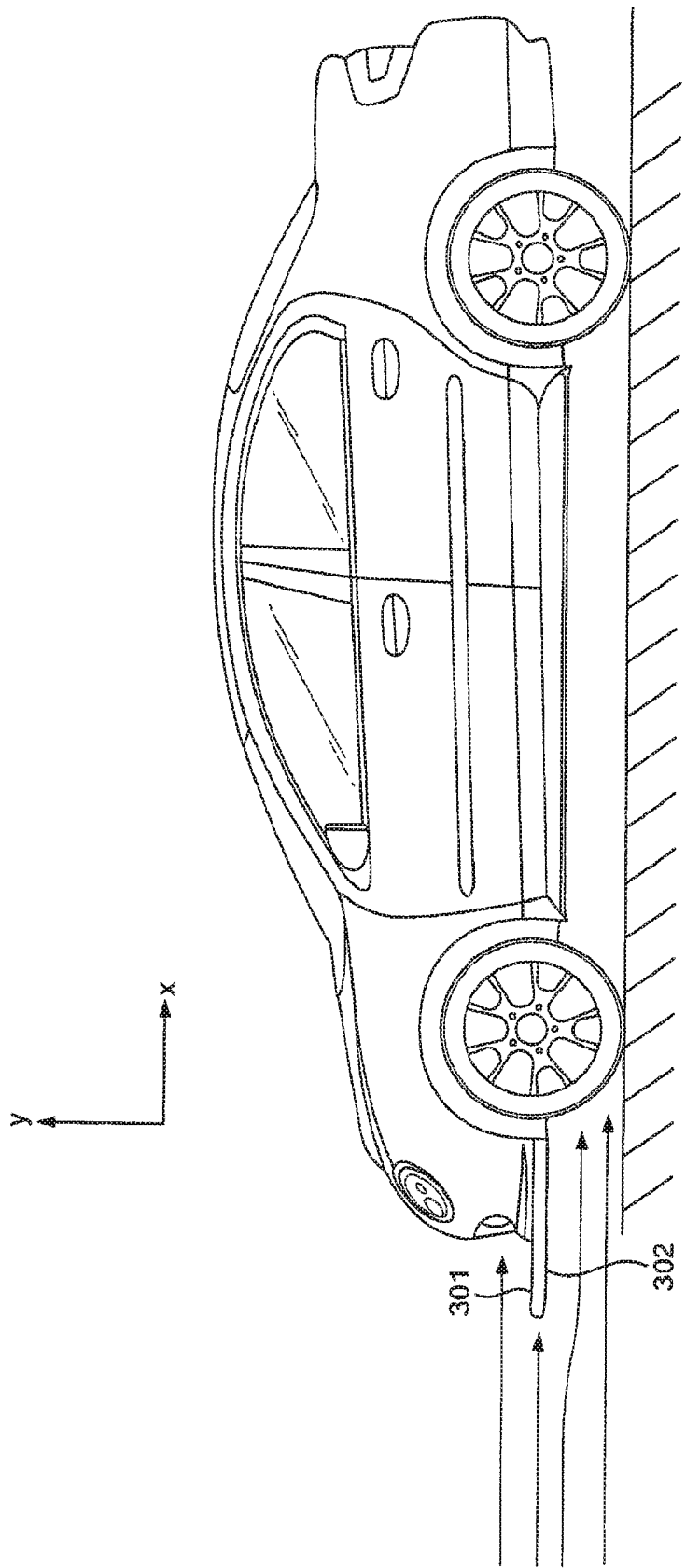
FIG. 3 depicts prior art and is a schematic diagram of a splitter employed at the front of a vehicle with the aim of generating downforce.
Figure 4:
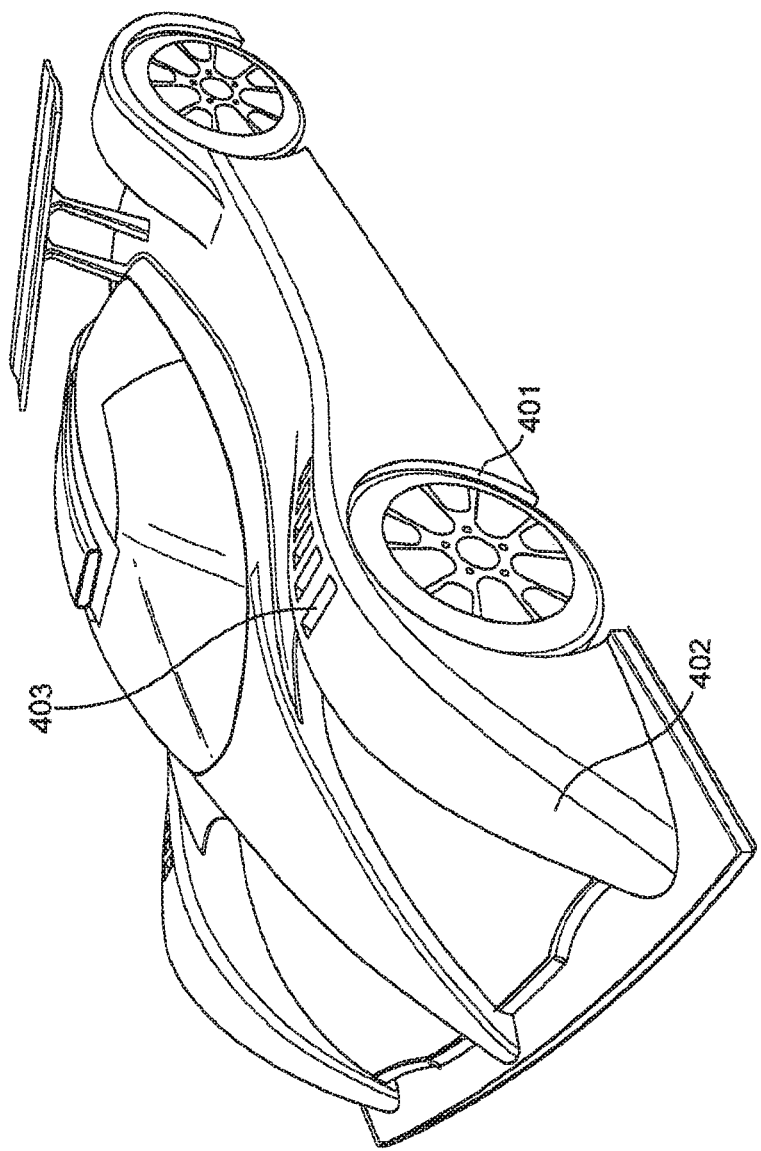
FIG. 4 depicts prior art and is a schematic diagram of louvered wheel arches aimed at improving the cooling of the brakes and increasing the downforce generated by the vehicle.
Figure 5A:
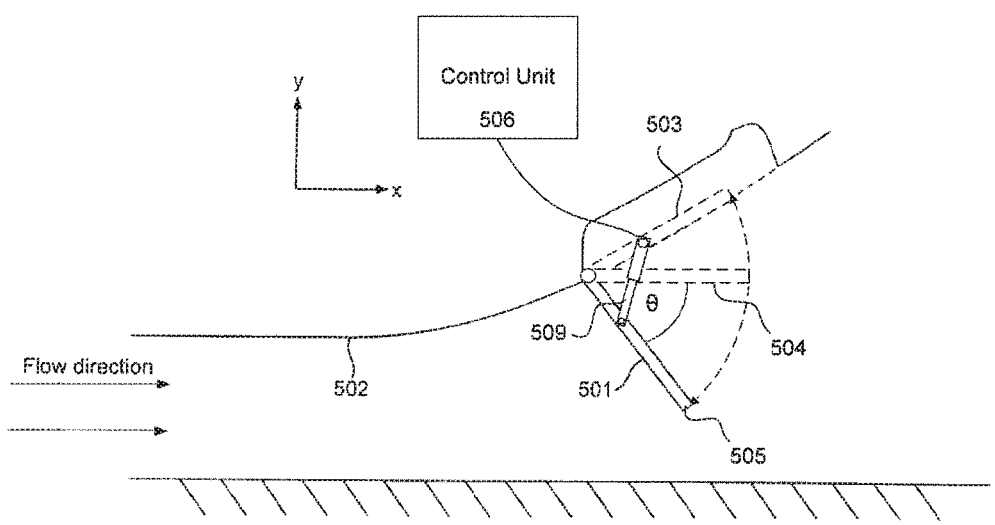
FIG. 5a is a side view of a system for controlling the downforce generated by a vehicle according to a first aspect of the present invention.

FIG. 5a shows a system for use in controlling the downforce generated by a vehicle in accordance with a first aspect of the present invention. A flap 501 is attached to a lower surface of a vehicle 502. In the example configuration shown in FIG. 5a the vehicle is travelling in the negative x-direction so that the airflow, taken in the frame of reference of the vehicle, is in the positive x-direction. The flap is deployable from a stowed position 503 shown by the dotted line to a deployed position 504. The deployed position 504 could be any position between the stowed position 503 and a maximum deployed position 505. In this example when the flap is in the stowed position 503 it is substantially flush with the underside surface of the vehicle. In alternative examples the flap may not be flush with the underside surface of the vehicle when in its stowed position 503. When the flap is in the stowed position 503 the cambered underside of the vehicle will generated downforce as it deflects the air flow upwards along its surface. When the flap is in a deployed position it extends into the airflow on the underside of the vehicle, causing the airflow to be disrupted. This causes the pressure of the air on the underside of the vehicle to increase and so decreases the downforce generated by the vehicle. As the angle, θ, through which the flap is deployed is increased the disruption to the airflow increases. When the flap is deployed through relatively large angles the airflow will begin to stagnate on the surface of the flap further increasing the pressure on the underside of the vehicle.

Figure 5B:
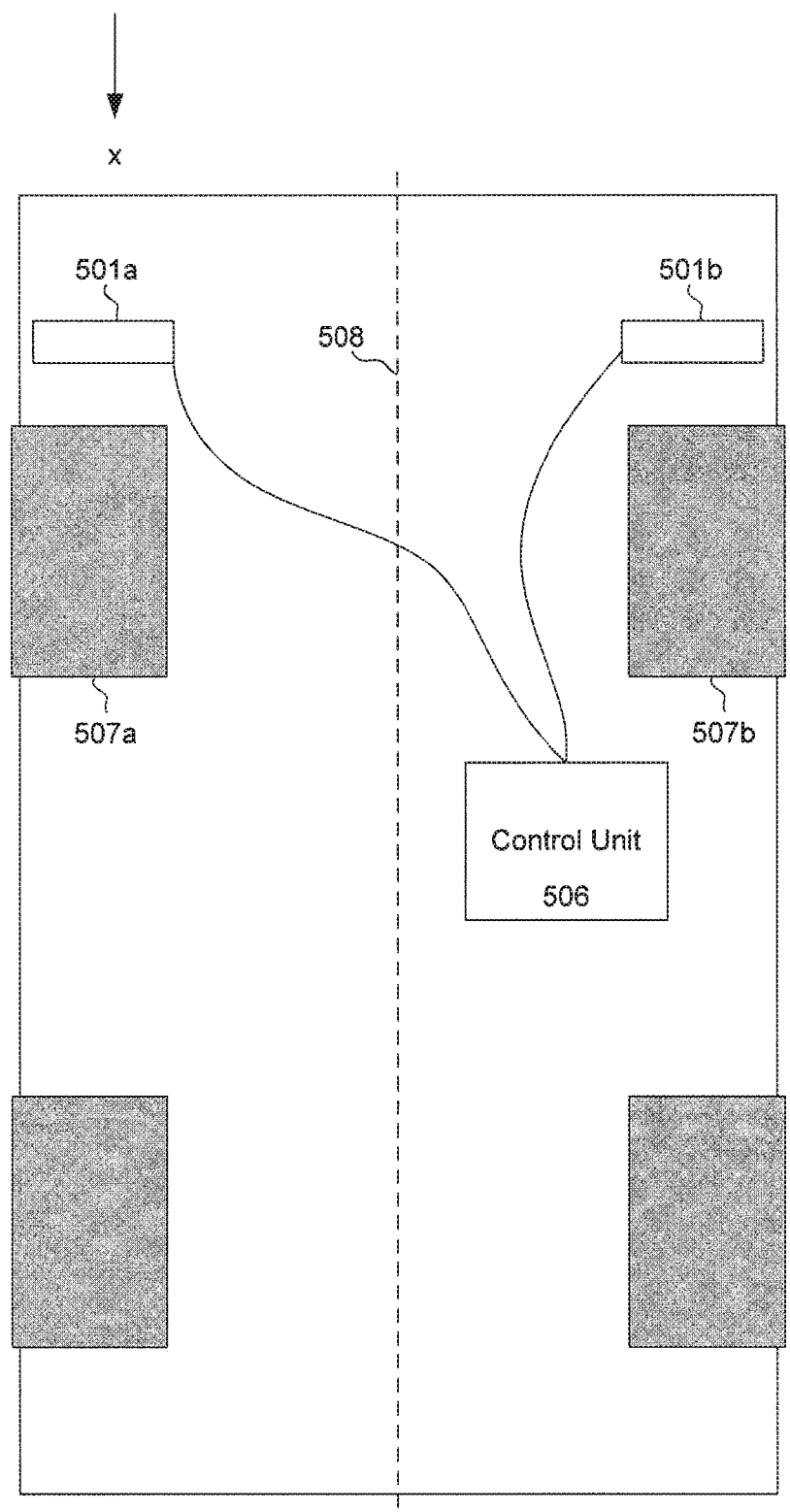
FIG. 5b is a bottom view of a system for controlling the downforce generated by a vehicle according to an aspect of the present invention using two flaps.

The flap may be positioned anywhere on the underside of the vehicle. However, since the flap operates to decrease the downforce generated by the vehicle by disrupting the airflow underneath the vehicle, the effectiveness of the flap will be greater when it can be deployed into a relatively fast airflow. For example the flap could be positioned on a cambered downforce generating surface underneath the vehicle. The flap could be positioned towards the front of the vehicle, for example in front of the front wheels 507a and 507b, as shown in FIG. 5b.

The downforce generated by the vehicle can be altered by controlling the angle through which the flap is to be deployed. In a practical implementation of this embodiment of the invention, a vehicle may be equipped with flaps 501a and 501b that are positioned symmetrically about the centreline 508 of the vehicle. The deployment of each flap may be controlled by a control unit 506. The control unit 506 could be arranged to receive inputs from the vehicle that indicate the dynamic state of the vehicle. The inputs could be, for example, suspension load, vehicle speed, lateral g-force, steering position, brake pedal force, brake pedal position, forward acceleration of the automobile or the position of one or more active aerodynamic devices of the automobile, for example the rear wing. The control unit 506 could then control the deployment of each flap in dependence on the dynamic state to control the downforce generated by the vehicle. The flaps can be deployed so as to control the aerodynamic balance of the vehicle. For example, if the rear wing of the vehicle is adjusted to produce less downforce when the vehicle is travelling at high speed, the flaps can be deployed so that the frontal region of the vehicle also produces less downforce. This allows the centre of pressure of the vehicle to stay close to its optimum position which maintains the aerodynamic balance of the vehicle. If the rear wing were adjusted to produce less downforce and the flaps remained in their stowed position 503, the centre of pressure of the vehicle would move towards the front of the vehicle, which is detrimental to the balance of the vehicle.

For example, the vehicle could be in a particular dynamic state when it is entering a corner. In this situation, the control unit 506 could independently control the deployment of the flaps situated on the left and right hand side of the vehicle. Independently controlling the deployment of each flap allows the loads on the suspension elements on the left and right hand sides of the vehicle to be controlled by altering the downforce generated by the left and right hand sides of the vehicle. Typically, when a vehicle enters a corner it experiences roll, in which the friction force acting on the tyres and the inertial force act to increase the load on the suspension elements of the vehicle located on the outside of the corner relative to the suspension elements of the vehicle located on the inside of the corner. This effect can also be described by saying that the centre of pressure of the vehicle is shifted laterally when the vehicle is cornering. Each flap can be positioned between its respective stowed position 503 and maximum deployed position 505 to control the downforce so that the downforce generated by the side of the vehicle located on the inside of the corner is greater than the downforce generated by the side of the vehicle located on the outside of the corner. This can help to even the load placed on the suspension elements and keep the vehicle as flat as possible as it enters a corner. The deployment of the flaps has the effect of controlling the downforce to minimise the lateral movement of the centre of pressure as the vehicle is cornering.

The vehicle could be in an alternative dynamic state when it generates a level of downforce greater than a predetermined value. This could happen if, for example, the vehicle is travelling above a certain speed. If a vehicle generates large levels of downforce it can result in a high load being placed on the suspension elements of the vehicle, with the effect that the suspension is operating outside of its optimum travel range. If the suspension elements are not operating within their optimum travel range the vehicle could exhibit uncharacteristic or unstable behaviour. The control unit 506 could control the deployment of the flaps to decrease the downforce generated by the vehicle in response to determining that the downforce generated by the vehicle is above a threshold value. This threshold value could be the downforce that causes the suspension to operate outside of its optimum range.

The vehicle could be in a further dynamic state when it is undergoing braking. When a vehicle undergoes braking there is a weight transfer to the front of the vehicle which increases the load on the suspension elements at the front of the vehicle relative to the load on the suspension elements at the back of the vehicle. The vehicle could be described as undergoing a "dive". This effect can also be described by saying that the centre of pressure of the vehicle undergoes a forward lateral displacement when the vehicle is braking. This can alter the handling of the vehicle if a driver enters a corner directly after heavy braking. It could therefore be desirable to control the downforce generated by the vehicle so as to reduce the downforce generated by the front section of the vehicle as the vehicle undergoes braking in order to balance the load placed on the front and rear suspension elements and to minimise the longitudinal movement of the centre of pressure. The control unit 506 could control the deployment in response to the values of the inputs, for example the loads placed on the front and rear suspension elements.

Controlling the deployment of the flaps could counter any tendency of the vehicle to dive due to braking, thereby keep the vehicle relatively level as it undergoes heavy braking and minimising the longitudinal movement of the centre of pressure.

Alternatively, depending on the position of the flaps on the vehicle, it may be preferable to maintain the flaps in their stowed position 503 when the vehicle is braking to control the downforce in order to reduce the tendency of the vehicle to dive and minimise the longitudinal movement of the centre of pressure. It may be preferable to maintain the flaps in their stowed position 503 when the vehicle is undergoing braking if, for example, the flaps are positioned towards the rear of the vehicle.

Any suitable mechanism can be employed to control the movement of the flap. For example, the flap may be attached to the vehicle by one or more actuators. The actuators could be, for example, in the form of an extendable rod controlled by hydraulics, pneumatics or an electrical motor. The position of the flap could then be altered by independently extending the rods. Alternatively the flap could be connected to the vehicle in such a way as to permit a hinging motion of the flap relative to the surface of the vehicle. The deployment of the flap into the airflow beneath the vehicle could then be controlled by controlling the hinging motion of the flap relative to the surface of the vehicle.

Any suitable type of flap can be used to disrupt the airflow on the underside of the vehicle in order to alter the downforce generated by the vehicle. For example, the flap may comprise a plate that can extend into the airflow beneath the vehicle. Any suitable type of control unit can be used to control the deployment of the flap, for example the control unit could be an ECU or a general purpose CPU.

The flap does not need to be substantially flush with the underside of the vehicle when in its stowed position 503. The invention is equally applicable to embodiments where a flap is deployable between a stowed position 503 and a maximum deployed position 505, wherein in the stowed position 503 the flap extends minimally into the flow of air beneath the vehicle and in the maximum deployed position 505 the flap extends maximally into the flow of air beneath the vehicle. The term "minimally" is being used to mean that the extension of the flap into the airflow beneath the vehicle is at a minimum for the range of flap positions between the stowed position 503 and maximum deployed position 505. The term "maximally" is being used to mean that the extension of the flap into the airflow beneath the vehicle is at a maximum for the range of flap positions between the stowed position 503 and maximum deployed position 505.

Figure 6A:
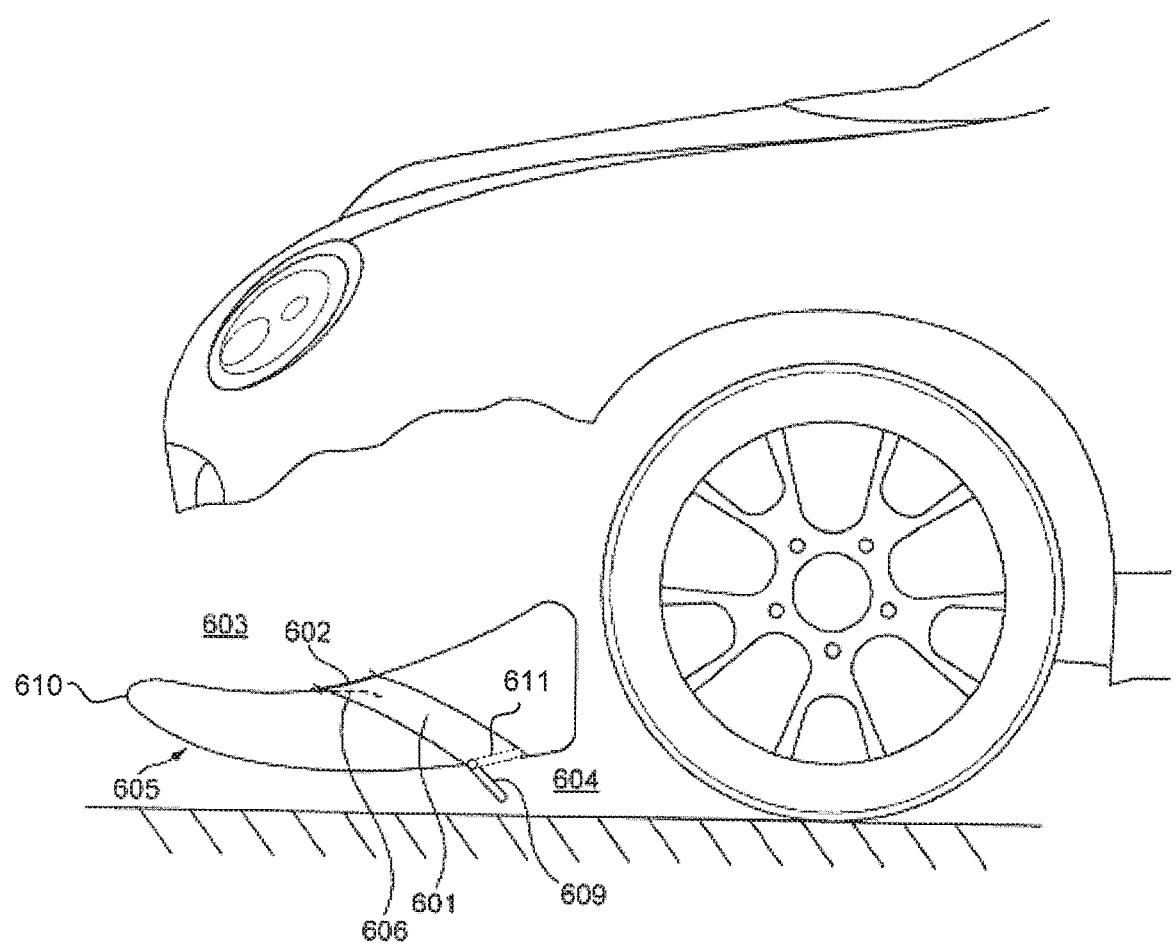
FIG. 6a is a system for controlling the downforce generated by a vehicle according to a second aspect of the present invention.

FIG. 6a shows a system for controlling the downforce generated by a vehicle in accordance with a second aspect of the present invention. A duct 601 is closed off at one end by an elastic restriction 602. The duct extends between a region 603 which is at relatively high pressure when the vehicle is in motion to a region 604 underneath the vehicle which is at relatively low pressure when the vehicle is in motion. The duct is positioned such that motion of the vehicle generates a pressure difference across the restriction. As the speed of the vehicle increases the pressure differential across restriction increases. This pressure differential causes the restriction to move from a first position in which the duct is substantially closed to a second position in which the duct is open. When the duct is open air is channelled from the relatively high pressure region to the relatively low pressure region underneath the vehicle, which decreases the downforce generated by the vehicle.

A suitable place for the duct could be, for example, in the region extending between a cooler inlet duct above the splitter 610 of the vehicle and a low pressure region on the underside of the vehicle, as is shown in FIG. 6a. If this configuration is adopted, the airflow exits the duct into an underside region of the vehicle 604. As the speed of the vehicle increases the pressure in the cooler inlet duct increases, whilst air that is channelled between the ground and the underside 605 of the splitter 610 creates a low pressure region 604 on the underside of the vehicle. A certain differential pressure across the restriction forces the restriction open. The dotted line 606 denotes an example position of the restriction once it has been forced open. The restriction is configured to move in dependence on a pressure differential, and so increasing the pressure differential causes the restriction to move further from its closed position.

The elastic restriction could comprise a non-elastic flap that is elastically joined to the duct, for example a flap coupled to the duct via a spring. Alternatively the flap and the join could be made of the same elastic material.

The duct and elastic restriction can be used in conjunction to decrease the downforce generated by the vehicle when the vehicle is travelling at significant speed. When a vehicle is travelling at a high speed it may generate a high level of downforce. This can result in a high load being placed on the suspension elements of the vehicle, with the effect that the suspension is operating outside of its optimum travel range. If the suspension elements are not operating within their optimum travel range the vehicle could exhibit uncharacteristic or unstable behaviour. Advantageously, this system can regulate the downforce generated by the vehicle as a function of the vehicle speed without the need for an active control mechanism. This is because as the vehicle speed increases, the pressure differential across the restriction also increases which causes the restriction to move further from its closed position. Moving the restriction further from its closed position allows the duct to channel more air from the higher pressure region to the lower pressure region leading to a larger decrease in downforce.

Figure 6B:
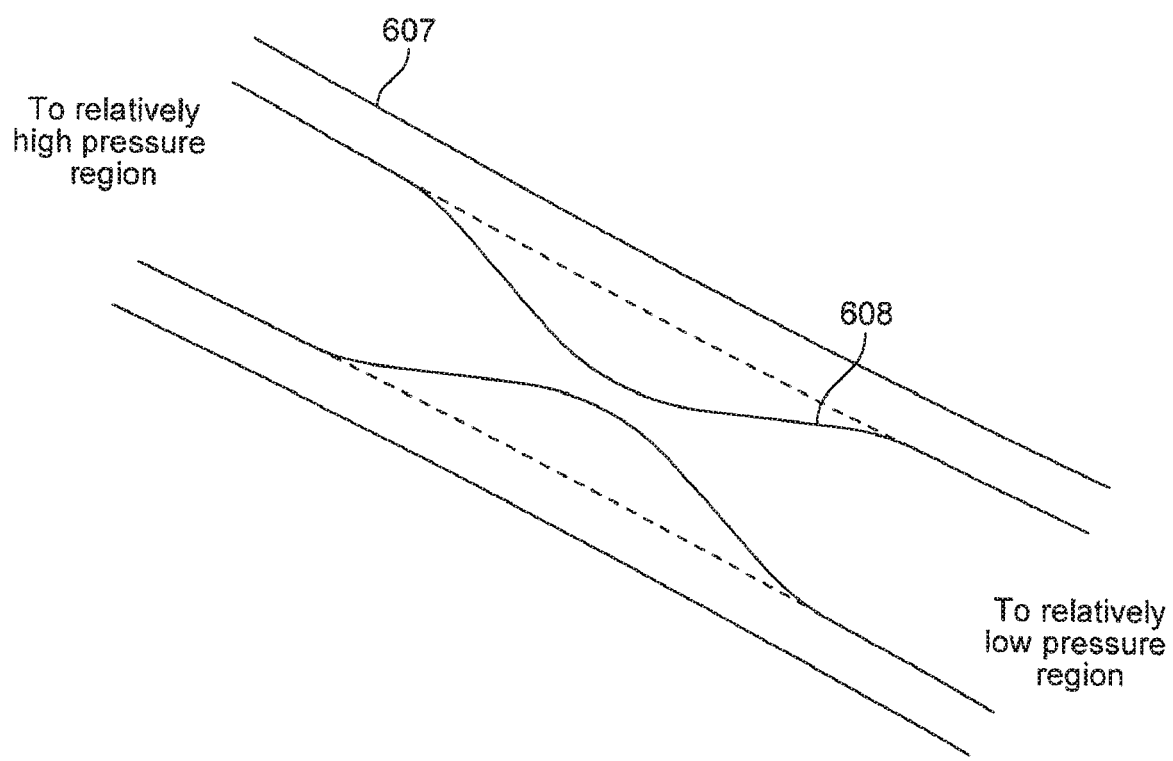
FIG. 6b is an alternative embodiment of the second aspect of the present invention.

The duct may comprise some other means of controlling the airflow from a high pressure region to a low pressure region. For example, the duct may be formed of an elastic material and be shaped such that the airflow from the high pressure region to the low pressure region is restricted when the pressure difference between these two regions is below a threshold value. An example of such a duct is shown in FIG. 6b. An inner surface 608 of the duct is made of a material with suitable elastic properties and is housed in an outer casing 607. When the pressure difference between the high pressure and low pressure regions is below a threshold value, the inner surface 608 of the duct adopts a configuration that restricts the airflow. An example configuration is shown by the solid line. When the pressure difference across the restriction increases, the duct can be forced open to a different configuration that allows greater airflow between the high pressure region and the low pressure region, for example the configuration defined by the dotted line.

It is desirable for the elastic restriction to be made of materials with certain characteristics. For example, it is desirable for the material to have sufficient elasticity to deform when the pressure differential across it is sufficiently large, but not to have an elasticity high enough that a pressure differential arising from expected vehicle speeds causes the elastic material to rupture, or to permanently deform, or to undergo flutter. It is also desirable for the material to be light. The exact properties of the elastic material can be tailored depending upon the desired application, for example in dependence upon the expected pressure differential to exist at certain vehicle speeds. Suitable materials for the elastic restriction could be, for example, plastic, rubber or a metal spring.

The duct may be positioned anywhere within the vehicle as long as it extends between a region of relatively high pressure and a region of relatively low pressure when the vehicle is in motion. However, because the control of airflow between the high pressure and low pressure regions alters the downforce generated by the vehicle, the duct and elastic restriction are more effective at altering the downforce when the pressure difference between these two regions is larger. The front of the vehicle is a suitable place for the duct due to the presence of a lower pressure region underneath the vehicle and the presence of higher pressure regions such as, for example, a cooling inlet duct, regions of the vehicle above the front splitter or an engine bay.

Figure 7:
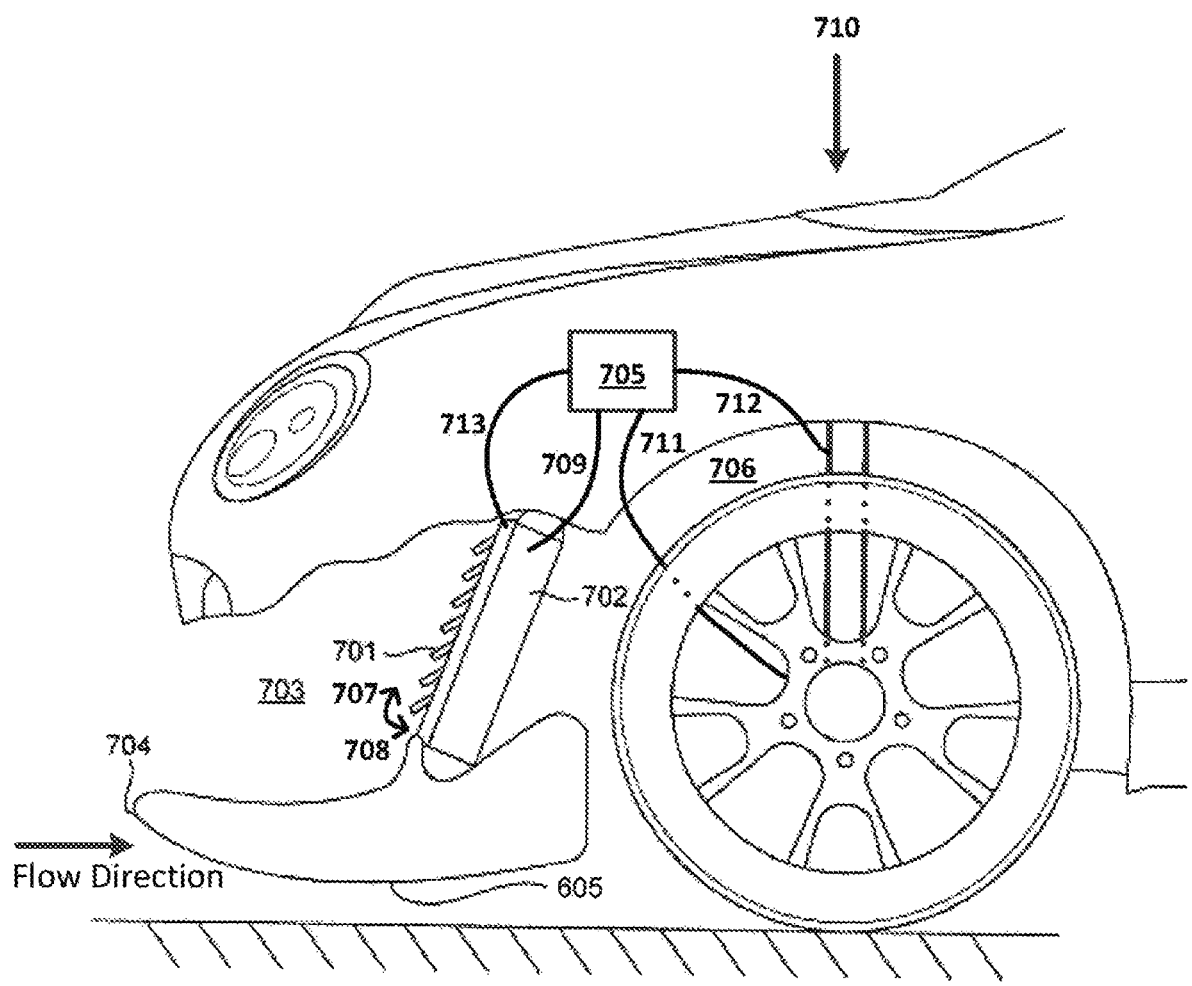
FIG. 7 is a system for controlling the downforce generated by a vehicle according to a third aspect of the present invention.

FIG. 7 shows an example of a system for use in controlling the level of downforce 710 generated by a vehicle according to a third aspect of the present invention. The system comprises a component 702, which in this example is a radiator, with an actively controlled restriction 701, which in this example is a set of louvres. The component 702 is positioned at the end of a cooling duct 703. The restriction 701 is moveable between a closed position 708 in which airflow into the component 702 is substantially impeded and a maximum open position 707 in which airflow into the component 702 is substantially unimpeded. A region of relatively high pressure is created in the cooling duct when the vehicle is in motion and the restriction 701 is in a closed position 708. Beneath the cooling duct is a splitter 704 with an underside portion 605. A wheel arch 706 is positioned behind the component 702 in the direction of forward travel of the vehicle. The front underside portion of the vehicle 605 and the region in the wheel arch 706 are regions at a lower pressure than the cooling duct 703 when the vehicle is in motion. The component 702 may be positioned, as in FIG. 7, such that the airflow exits the component 702 into the lower pressure region of the wheel arch 706. If this position is adopted there is a flow of air from the higher pressure region of the cooling duct to the lower pressure region of the wheel arch when the restriction 701 is in an open position. The vehicle therefore generates less downforce 710 when the restriction 701 is in an open configuration compared to when the restriction 701 is in a closed configuration. Opening the restriction 701 is also results in an increase in drag compared to when the restriction 701 is closed because more air enters the turbulent flow region of the wheel arch. Alternatively the restriction 701 may be positioned behind the radiator component 702 in the direction of travel of the vehicle. The restriction 701 may be multiple slats that are moveable from a position in which they substantially block an airflow through the duct to a position in which airflow through the duct is substantially unimpeded.

The movement of the restriction 701 can be controlled by a control unit 705 via a connection 713. The control unit 705 could be arranged to receive inputs, e.g., vehicle speed 711 and suspension load 712 (discussed within), that indicate the dynamic state of the vehicle and to control the movement of the restriction 701 in dependence on that dynamic state to control the downforce 710 generated by the vehicle and minimise the movement of the centre of pressure of the automobile. This enables the cooling and downforce to be optimised depending on the operational conditions of the vehicle in order to maximise vehicle performance. For example, if the radiator's need for cooling is reduced (because, e.g., the atmospheric climate is cool or the engine is operating at a relatively low rpm) the control unit 705 can close the louvres which has the effect of reducing the drag and increasing the downforce generated by the vehicle. Conversely, in situations where the radiator's need for cooling is increased the control unit can open the louvres. The control unit 705 can be configured to position the louvres in an open configuration if cooling is required even if it is also desirable to increase the downforce generated by the vehicle. The temperature 709 of the component 702, in this example a radiator, could be used to indicate whether cooling is required, for example if the temperature 709 of the radiator exceeds a predetermined value then cooling is required and the louvres are positioned in an open configuration, independently of the need to control the downforce.

Any type of restriction 701 whose movement can be controlled by a control unit can be used within the duct to restrict the flow into the component 702. A suitable restriction 701 could be, for example, actively controlled louvres (as shown in FIG. 7), or a mechanically controlled plate. This embodiment of the present invention is equally applicable to any suitable component of a vehicle that requires cooling. The component 702 could be, for example, a radiator (as shown in FIG. 7), the brakes of the vehicle or the engine bay of the vehicle.

The inputs into the control unit could be, for example, suspension load 712, vehicle speed 711, lateral g-force, steering position, brake pedal force, brake pedal position, forward acceleration of the automobile etc.

The vehicle could be in a particular dynamic state when it generates a level of downforce greater than a predetermined value. This could happen if, for example, the vehicle is travelling above a certain speed. If a vehicle generates large levels of downforce it can result in a high load being placed on the suspension elements of the vehicle, with the effect that the suspension is operating outside of its optimum travel range. If the suspension elements are not operating within their optimum travel range the vehicle could exhibit uncharacteristic or unstable behaviour. The control unit could control the movement of the restriction to decrease the downforce generated by the vehicle in response to determining that the downforce generated by the vehicle is above a threshold value.

The vehicle could be in an alternative dynamic state when it is undergoing braking. When a vehicle undergoes braking there is a weight transfer to the front of the vehicle which increases the load on the suspension elements at the front of the vehicle relative to the load on the suspension elements at the back of the vehicle. The vehicle could be described as undergoing a "dive". This effect can also be described by saying that the centre of pressure of the vehicle undergoes a forward lateral displacement when the vehicle is braking. This can alter the handling of the vehicle if a driver enters a corner directly after heavy braking. It could therefore be desirable to control the downforce generated by the vehicle so as to reduce the downforce generated by the front section of the vehicle as the vehicle undergoes heavy braking in order to balance the load placed on the front and rear suspension elements and minimise the longitudinal movement of the centre of pressure. In a preferred embodiment of the present invention the control unit could control the movement of the restriction such that the airflow from the high pressure region to the low pressure region is substantially unimpeded if it determines that the vehicle is undergoing braking. The control unit could control the movement in response to the values of the inputs, for example the load placed on the front and rear suspension elements.

In a practical implementation of the present embodiment, a vehicle may be equipped with ducts that are positioned either side of the centreline of the vehicle. Each duct could contain a restriction, for example louvres or a mechanical flap, which can be independently controlled by a control unit to control the airflow from a high pressure region to a low pressure region. The control unit could control the movement of each restriction in dependence on the dynamic state of the vehicle. For example, the vehicle could be in a particular dynamic state when it is entering a corner. In this situation, each restriction can be independently positioned between its respective closed position and maximum open position to control the downforce generated by the vehicle so that the downforce generated by the side of the vehicle located on the inside of the corner is greater than the downforce generated by the side of the vehicle located on the outside of the corner. This can help to even the load placed on the suspension elements to counter the roll of the vehicle and keep the vehicle as flat as possible as it enters a corner by minimising the lateral movement of the centre of pressure of the vehicle.

In a preferred embodiment the control unit 105 is configured to control the movement of the restriction 701 only if the temperature 709 of the component 702 is below a predetermined level; if the temperature 709 of the component 702 is above this level the restriction 701 is positioned in its open position such that the cooling airflow to the component 702 is substantially unimpeded.

The first and second aspects of the present invention may be combined into a single system for controlling the downforce generated by a vehicle. This combined system can be understood by way of reference to FIG. 6a. The system in FIG. 6a comprises a duct 601 with an elastic restriction 602 that is used to control airflow between a region 603 which is at relatively high pressure when the vehicle is in motion to a region 604 which is at relatively low pressure when the vehicle is in motion. The system further comprises a moveable flap 609 that is substantially flush with the underside of the vehicle when in its closed position 611 (shown by the dotted line). The flap can operate in the same manner as the flap 501 described with reference to FIG. 5a. Thus if the pressure difference across the restriction has forced the restriction into an open position, and the flap is deployed through an angle θ, air flows from the high pressure duct 603 to the lower pressure region underneath the vehicle 604. This leads to a reduction in the downforce generated by this frontal portion of the vehicle, as discussed above. The deployed flap 609 further contributes to this reduction in downforce by disrupting the flow of the high speed, low pressure airflow on the underside portion of the vehicle 605. The amount of downforce generated by the vehicle can be altered by changing the angle through which the flap is deployed. Smaller angles of deployment will limit the flow of high pressure air through the duct, and the shallower angle of the flap relative to the underside section of the body will result in less spoiling of the airflow over the underside section. Increasing the angle of deployment will lead to a larger flow rate of air through the duct into the lower pressure region and also to a greater spoiling of the flow over the underside section of the vehicle 605.

The control unit can control the deployment of the flap 609 in dependence upon the dynamic state of the vehicle in a similar manner to the flap 501. The addition of a controllable flap to a duct containing an elastic restriction allows for a greater control of downforce than a duct containing just the elastic restriction. For example, if the pressure differential across the elastic restriction is enough to move the restriction to an open configuration, airflow from the higher pressure region can still be restricted from flowing into the lower pressure region by way of the mechanical flap 609. It also provides for a more accurate control of the downforce because the control unit can determine the deployed position of the flap 609 in dependence on the dynamic state of the vehicle.

Figure 8:
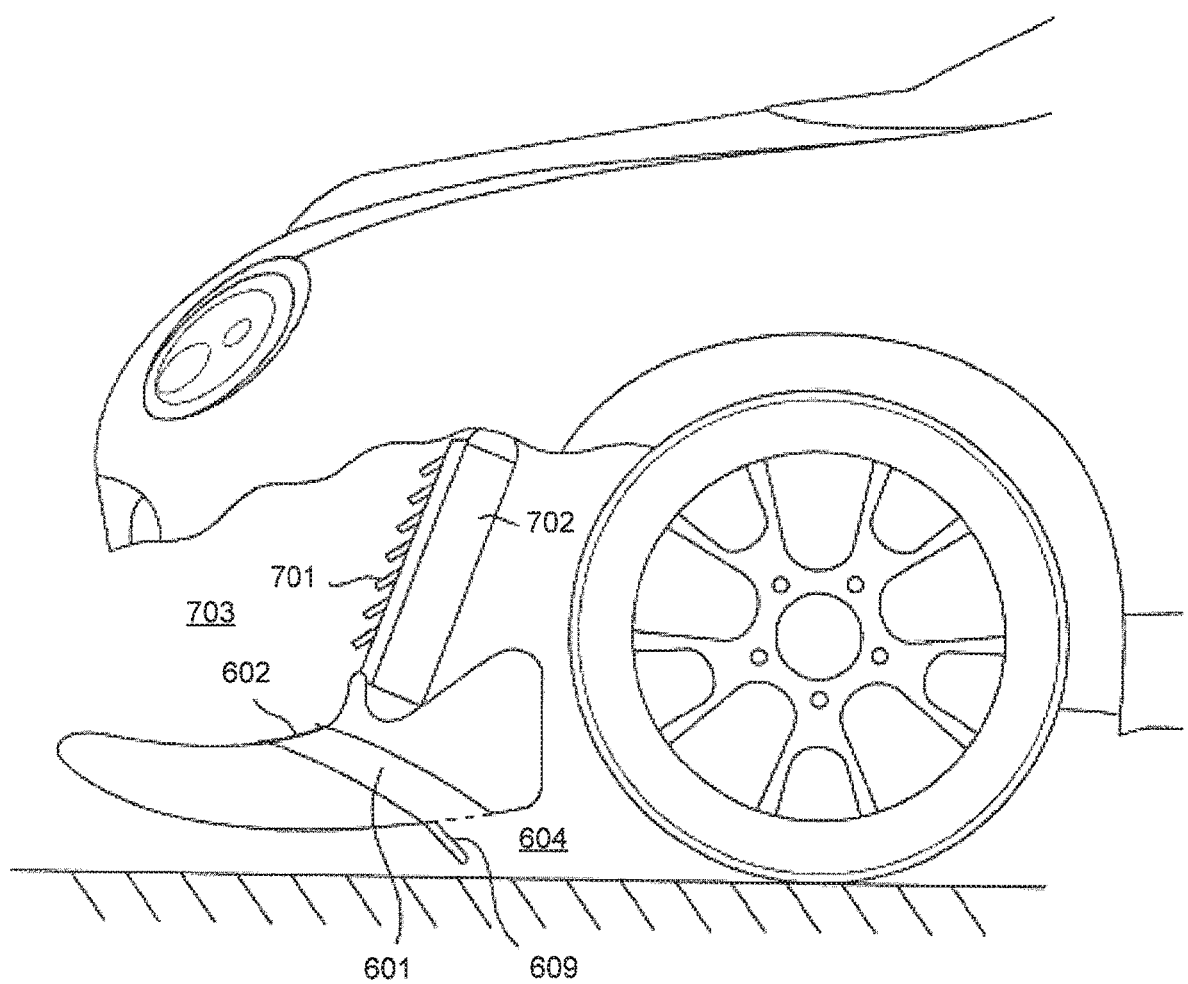
FIG. 8 is a system for controlling the downforce generated by a vehicle according to the first, second and third aspects of the present invention.

All three aspects of the present invention may be combined to form a single system for controlling the downforce generated by a vehicle. An example of such a system is shown in FIG. 8. This system comprises a component 702, which in this example is a radiator, with adjustable restriction 701, which in this example is a set of louvres, the component 702 being positioned at the end of a cooling duct 703. A duct 601 is sealed at one end by an elastic restriction 602 and at its other end by a mechanical flap 609. The duct 601 provides a potential path for air to flow from the cooling duct 703 to a section of the underside of the vehicle 604. The component 702 with actively controlled restriction 701 operates in the same manner as the system described above with reference to FIG. 7. The duct 601 with elastic restriction 602 and mechanical flap 609 operates in the same manner as the system described above with reference to FIG. 6a. In the system shown in FIG. 8 the downforce may be controlled by either controlling the opening of the restriction 701 or controlling the deployment of the mechanical flap when the elastic restriction is open, or through a combination of these mechanisms. The position of the restriction 701 and the position of the mechanical flap can be controlled by a control unit. The control unit can be adapted to receive one or more inputs which indicate the dynamic state of the vehicle and to control the deployment of the flap and the configuration of the restriction 701 in dependence on the dynamic state to control the downforce generated by the vehicle, for example to minimise lateral or longitudinal movement of the centre of pressure of the vehicle to maintain the aerodynamic balance.

The system shown in FIG. 8 provides a greater scope for altering the level of downforce for a particular dynamic state of the vehicle than the individual systems described in FIGS. 5-7. For example, if it is determined that cooling to a component of the vehicle is required (for example, to the engine or the brakes or radiator), but relatively high levels of downforce are also desired, the restriction 701 can be opened whilst the mechanical flap on the underside of the vehicle can be held shut. With this example configuration, even if the pressure in the cooling inlet duct is sufficient to force the elastic flap open, air will not be able to flow through the duct to the low pressure region 907 because the mechanical flap is held shut. This helps to negate the loss of downforce resulting from the opening of the restriction 701. In an alternative scenario it may be desirable to alter the level of downforce by a relatively large amount, or to alter the level quickly. This may be desirable when the vehicle is undergoing heavy braking, which is typically when it experiences the largest accelerative forces and also the fastest weight transfer. This could be done by opening the restriction 701 and deploying the mechanical flap 609 through a relatively large angle. This would allow high pressure air to flow into the low pressure regions of the wheel arch and underside of the body. The deployed flap would further reduce the downforce by spoiling the air flow over the underside of the body. These components could therefore work in conjunction to control the downforce so as to reduce the downforce generated by the frontal section of the vehicle to minimise the longitudinal movement of the centre of pressure of the vehicle.

A vehicle may be equipped with a plurality of any of the systems described above, for example a particular system may be positioned either side of the centreline of the vehicle. A control unit can be used to control the downforce generated by one system independently of the system on the other side of the centreline. The downforce generated by each system can be controlled in dependence upon the dynamic state of the vehicle, for example the downforce generated by the vehicle or the brake force applied to a brake pedal of the vehicle, as discussed above. The control unit may control the systems by any of the means discussed with reference to FIGS. 5-8. The "system" may be any of the systems discussed with reference to FIGS. 5-8.

Alternatively the systems may be actively controlled to improve the performance of the vehicle. The braking, steering and acceleration of the vehicle during transient and cornering manoeuvres is influenced by the distribution of loads placed on the suspension elements and the position of the centre of pressure, and so controlling these loads allows the performance of the vehicle to be optimised. When the vehicle is entering a corner the control unit can control the downforce each system generates, resulting in a re-distribution of load forces on the suspension elements of the vehicle. The control unit may control the systems by any of the means discussed with reference to FIGS. 5-8. The "system" may be any of the systems discussed with reference to FIGS. 5-8.

The applicant hereby discloses in isolation each individual feature described herein and any combination of two or more such features, to the extent that such features or combinations are capable of being carried out based on the specification as a whole in the light of the common knowledge of a person skilled in the art, irrespective of whether such features or combinations of features solve any problems disclosed herein, and without limitation to the scope of the claims. The applicant indicates that aspects of the present invention may consist of any such individual feature or combinations of features. In view of the foregoing description it will be evident to a person skilled in the art that various modifications may be made within the scope of the invention.

The invention claimed is:

1. An automobile comprising:
a duct arranged to channel air from a region which is at relatively high pressure when the automobile is in motion to a region underneath the automobile which is at relatively low pressure when the automobile is in motion, the duct including a resilient elastic restriction arranged to substantially close off the duct, the duct being configured such that motion of the automobile generates a pressure difference across the elastic restriction, the elastic restriction being configured to open when the pressure difference approximately exceeds a predetermined value so as to allow air to flow from the relatively high pressure region to underneath the automobile and reduce the downforce generated by the automobile.

2. The automobile as claimed in claim 1, wherein the region underneath the automobile is in front of a front wheel of the automobile.

3. The automobile as claimed in claim 1, wherein the resilient elastic restriction is arranged to be substantially flush with a surface of the duct when it substantially closes off the duct.

4. The automobile as claimed in claim 1, wherein the resilient elastic restriction is configured to open when the automobile is travelling approximately above a certain speed.

5. The automobile as claimed in claim 1, wherein the resilient elastic restriction comprises a first flap coupled by a resilient elastic member to the duct.

6. The automobile as claimed in claim 1, wherein the automobile further comprises a front splitter and the region of relatively high pressure is above the front splitter.

7. The automobile as claimed in claim 1, wherein the automobile further comprises:
a second flap positioned on the underside of the automobile, the second flap being deployable from a first position to a second position such that the duct can only provide a path for the airflow from the relatively high pressure region to a region underneath the automobile when the second flap is deployed from its first position; and a control unit configured to, when the automobile is in motion, position the second flap between said first and second positions so as to control the downforce generated by the automobile.

8. The automobile as claimed in claim 7, wherein the second flap is arranged such that, when the automobile is in motion, the second flap extends minimally into the flow beneath the automobile when it is in its first position and extends maximally into the flow beneath the automobile when in its second position.

9. The automobile as claimed in claim 7, wherein the control unit is adapted to:
receive one or more inputs that indicate the dynamic state of the automobile; and
select a position of the second flap in dependence on the said dynamic state so as to control the downforce generated by the automobile.

10. The automobile as claimed in claim 9, wherein if the one or more inputs indicate that the automobile is in a first dynamic state in which the downforce generated by the automobile exceeds a predetermined level, the position of the second flap is selected so as to reduce the downforce generated by the automobile.

11. The automobile as claimed in claim 9, wherein if the one or more inputs indicate that the automobile is in a second dynamic state in which the vehicle is undergoing braking, the position of the second flap is selected so as to counter the tendency of the automobile to dive due to braking.

12. The automobile as claimed in claim 7, wherein the automobile further comprises a second duct arranged to channel air from a region which is at relatively high pressure when the automobile is in motion to a region underneath the automobile, the second duct including a resilient elastic restriction arranged to substantially close off the second duct, the second duct being configured such that motion of the automobile generates a pressure difference across the elastic restriction, the elastic restriction being configured to open when the pressure difference approximately exceeds a predetermined value so as to allow air to flow from the relatively high pressure region to underneath the automobile and reduce the downforce generated by the automobile.

13. The automobile as claimed in claim 12, wherein the resilient elastic restriction comprises a third flap coupled by a resilient elastic member to the second duct.

14. The automobile as claimed in claim 12, wherein the automobile further comprises:
a fourth flap positioned on the underside of the automobile, the fourth flap being deployable from a first position up to a second position such that the second duct can only provide a path for the air to flow from the relatively high pressure region to the region beneath the automobile through second duct when the fourth flap is deployed from its first position, the control unit being configured to, when the automobile is in motion, position the fourth flap between the first and second positions of the fourth flap so as to control the downforce generated by the automobile.

15. The automobile as claimed in claim 14, wherein the second flap and fourth flap are positioned either side of the centreline of the automobile.

16. The automobile as claimed in claim 15, wherein the control unit is adapted to:
receive one or more inputs that indicate the dynamic state of the automobile;
position the second flap between its said first and second positions;
position the fourth flap between its said first and second positions, the positions of the second flap and fourth flap being chosen in dependence on the dynamic state so as to control the downforce generated by the automobile, wherein if the inputs indicate that the automobile cornering, the positions of the second flap and fourth flap are selected so as to counter the roll of the automobile.

17. The automobile as claimed in claim 16, wherein the control unit is configured to select the positions of second flap and fourth flap such that the flap on the outside of the corner is extended to a greater degree than the flap on the inside of the corner.

* * * * *